US009565629B2

(12) United States Patent
Ljung (10) Patent No.: US 9,565,629 B2
(45) Date of Patent: Feb. 7, 2017

(54) DISCONTINUOUS TRAFFIC IN A TELECOMMUNICATION NETWORK USING TERMINAL SUGGESTED DRX/DTX PATTERN

(75) Inventor: Rickard Ljung, Helsingborg (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 238 days.

(21) Appl. No.: 13/805,534

(22) PCT Filed: May 16, 2012

(86) PCT No.: PCT/EP2012/059174
§ 371 (c)(1),
(2), (4) Date: Dec. 19, 2012

(87) PCT Pub. No.: WO2013/170896
PCT Pub. Date: Nov. 21, 2013

(65) Prior Publication Data
US 2013/0308511 A1    Nov. 21, 2013

(51) Int. Cl.
*H04L 12/28* (2006.01)
*H04W 52/02* (2009.01)
(Continued)

(52) U.S. Cl.
CPC .......... *H04W 52/0209* (2013.01); *H04L 29/06* (2013.01); *H04W 52/0216* (2013.01); *H04W 76/048* (2013.01)

(58) Field of Classification Search
CPC ................................................. H04W 76/048
(Continued)

(56) References Cited

U.S. PATENT DOCUMENTS 9,161,371 B2 * 10/2015 Ehsan ............... H04W 72/1284
9,432,942 B2 * 8/2016 Damnjanovic ..... H04L 12/4633
(Continued)

FOREIGN PATENT DOCUMENTS

WO     2008/111684 A1     9/2008

OTHER PUBLICATIONS 802.15.1-2005—IEEE Standard for Information Technology—Telecommunications and Information Exchange Between Systems—Local and Metropolitan Area Networks—Specific Requirements: Wireless Medium Access Control (MAC) and Physical Layer (PHY) Specifications for Wireless Personal Area Networks (WPANs), Aug. 1, 2005, IEEE, Part 15.1, p. 1.*

(Continued)

*Primary Examiner* — John Pezzlo
(74) *Attorney, Agent, or Firm* — Renner, Otto, Boisselle & Sklar, LLP.

(57) ABSTRACT

Mobile telecommunication device includes an application module to execute applications, radio module to communicate radio signals to and from a remote network node, and base band module to communicate data to and from the radio module, and to code and decode the data using a communication protocol. The base band module includes modem usage analyzing submodule to receive modem requests from applications, and to analyze all modem requests received during predefined time period. The base band module includes pattern suggestion submodule to receive information on the modem requests from the modem usage analyzing submodule, and to select reception and transmission pattern using information on the modem requests. The base band module includes Radio Resource Control protocol handler configured to send one or more parameters defining the selected reception and transmission pattern to the net- (Continued)

work node. The utilized DRX/DTX parameters can be optimized to save battery in the device.

8 Claims, 5 Drawing Sheets

(51) Int. Cl.
*H04W 76/04* (2009.01)
*H04L 29/06* (2006.01)
*H04J 1/16* (2006.01)

(58) Field of Classification Search
USPC ............................ 370/278, 252, 329, 311
See application file for complete search history.

(56) References Cited

U.S. PATENT DOCUMENTS

| | | | |
|---|---|---|---|
| 2007/0177569 A1* | 8/2007 | Lundby | 370/349 |
| 2008/0232310 A1* | 9/2008 | Xu | 370/329 |
| 2011/0106969 A1* | 5/2011 | Choudhury et al. | 709/236 |
| 2012/0087341 A1 | 4/2012 | Jang et al. | |
| 2013/0088983 A1* | 4/2013 | Pragada | H04W 16/14 |
| | | | 370/252 |

OTHER PUBLICATIONS

International Search Report, corresponding to PCT/EP2012/059174, completion date Dec. 4, 2012.
Written Opinion, corresponding to PCT/EP2012/059174, completion date Dec. 4, 2012.

\* cited by examiner

DISCONTINUOUS TRAFFIC IN A TELECOMMUNICATION NETWORK USING TERMINAL SUGGESTED DRX/DTX PATTERN

TECHNICAL FIELD OF THE INVENTION

The present invention relates discontinuous data communication between a telecommunication device and a network node of a telecommunication network. It specifically relates to communicating using a DRX/DTX pattern suggested by the telecommunication device.

DESCRIPTION OF THE RELATED ART

For transmitting and receiving signals a mobile telecommunication device contains a modem which typically consists of different hardware components that may or may not be physically separated. In general these components can be divided into a so-called radio block and a so-called baseband block. The radio block is responsible for the radio frequency transmission (Tx) to base stations, i.e. modulation of digital signals into analogue signals that are transmitted on a certain carrier frequency in the so-called uplink (UL) direction, and also for the reception (Rx) which means demodulation of the radio signal transmitted in the downlink (DL) direction from the base station(s) to the terminal. The baseband block of the modem is in turn responsible of coding and decoding the data sent to/from the radio block, following the communication protocols defined and standardized for e.g. mobile radio communication systems such as WCDMA or LTE.

In both of the just mentioned communication technologies (WCDMA and LTE) the modem can be operating in continuous mode, meaning that once the modem is active with e.g. a voice call or a data transmission/reception session the radio block inside the modem is continuously active with transmission and reception of signals. However, since the radio block typically consumes a significant amount of current from the battery, there is a potential to improve battery life if the modem instead can operate in a discontinuous mode and switch off the radio block during short periods of time, even when the modem is active with e.g. a voice call or a data transmission/reception session.

This potential to save battery current has been identified in the standardization of both WCDMA and LTE, and the basic technologies for such battery life improvement techniques are called discontinuous reception (DRX) and discontinuous transmission (DTX) for downlink and uplink respectively. The basic functionality of DRX and DTX is that the network via its controlling base station for a certain session identifies the possible use of DRX/DTX and transmits a control signal identifying a DRX/DTX pattern to the terminal. The DRX/DTX pattern determines during what periods the terminal is allowed to switch off the receiver (for DRX) and the transmitter (for DTX). Hence, when DRX/DTX is activated the transmission and reception of data is done in bursts when the radio block is switched on. In between these bursts the Tx and/or Rx part of the radio block is switched off, saving battery current, while the baseband block is still active processing data for the previous and next transmission/reception burst. The DRX/DTX properties are completely controlled by the network and base station, with no possibility for the terminal to influence the choice of DRX/DTX parameters, which will often result in a non-optimal choice for the DRX/DTX parameters.

SUMMARY

It is an object of the present to provide a mobile telecommunication device that uses a DRX/DTX pattern which will save more battery as compared to the present devices.

The object is achieved by a mobile telecommunication device comprising an application module configured to execute one or more applications, a radio module configured to communicate radio signals to and from a remote network node, and a base band module configured to communicate data to and from the radio module, and to code and decode the data using a communication protocol. The base band module comprises a modem usage analysing submodule configured to receive modem requests from the one or more applications, and to analyze all modem requests received during a predefined time period. The base band module also comprises a pattern suggestion submodule configured to receive information on the modem requests from the modem usage analyzing submodule, and to select a reception and transmission pattern using the information on the modem requests. The base band module also comprises a Radio Resource Control protocol handler configured to send one or more parameters defining the selected reception and transmission pattern to the network node.

For a state of the art network node it may be complicated to evaluate and select the most suitable DRX/DTX parameters for each active terminal, because the network node will not have full knowledge of the expected data transmission/reception properties of the services running in each of the connected terminals. Only a few standard/typical DRX/DTX settings will be used by the base stations, always transmitted to the terminals independent without a possibility to check whether there is a larger amount of terminal battery current to be saved. With this invention, the possibility for the terminals to suggest a proposal of DRX/DTX parameters and to transmit the suggestions to the base station is provided. The decision on what DRX/DTX pattern to use will preferably still remain within network and base station control, but the proposed solution will improve the possibility for base stations to utilize suitable DRX/DTX patterns based on each terminal service use, and hence improve battery life within the terminals.

In an embodiment, the mobile telecommunication device as described above is configured to:

receive a control signal from the network node, the control signal identifying a further reception and transmission pattern to be used for a certain session, and switch on and off the radio module during the session according to the further reception and transmission pattern.

In a further embodiment, the pattern suggestion submodule is configured to select the reception and transmission pattern out of a set of possible patterns stored on the mobile telecommunication device.

According to another aspect of the invention, a network node for a telecommunication network is provided, comprising a radio module configured to communicate radio signals to and from a mobile telecommunication device, and a base band module configured to communicate data to and from the radio module, and to code and decode the data using a communication protocol. The base band module comprises:

a proposed pattern receiving submodule configured to receive one or more parameters defining a proposed reception and transmission pattern to be received from the mobile telecommunication device;

a pattern selecting submodule configured to select a reception and transmission pattern, wherein if one or more network criteria are met, the proposed reception and transmission pattern will be selected;

a Radio Resource Control protocol handler configured to receive and send one or more parameters defining the selected reception and transmission pattern to the mobile telecommunication device.

In an embodiment the one or more criteria comprise at least one or more of the following:

a level of interference in the network receiver is below an acceptable level;

a risk to lose the connection between the mobile telecommunication device and the network node is below an acceptable risk level.

According to another aspect of the invention, a method of executing a mobile telecommunication device is provided comprising:

setting up a communication with a remote network node via a modem;

executing one or more applications, wherein the applications request access to the modem;

analyzing the modem requests during a predefined time period;

selecting a reception and transmission pattern using information on the modem requests;

sending one or more parameters defining the selected reception and transmission pattern to the network node.

According to another aspect of the invention, a method of executing a network node of a telecommunication network is provided comprising:

setting up a communication with a mobile telecommunication device via a modem;

receiving a RRC connection request from the mobile telecommunication device, the RRC connection request comprising one or more parameters defining a suggested reception and transmission pattern;

selecting a reception and transmission pattern, wherein if one or more network criteria are met, the proposed reception and transmission pattern will be selected;

sending an RRC connection setup message to the mobile telecommunication device (1).

DETAILED DESCRIPTION OF EMBODIMENTS

The present invention will now be described with reference to the figures, in which like reference labels are used to refer to like elements throughout.

Figure 1:
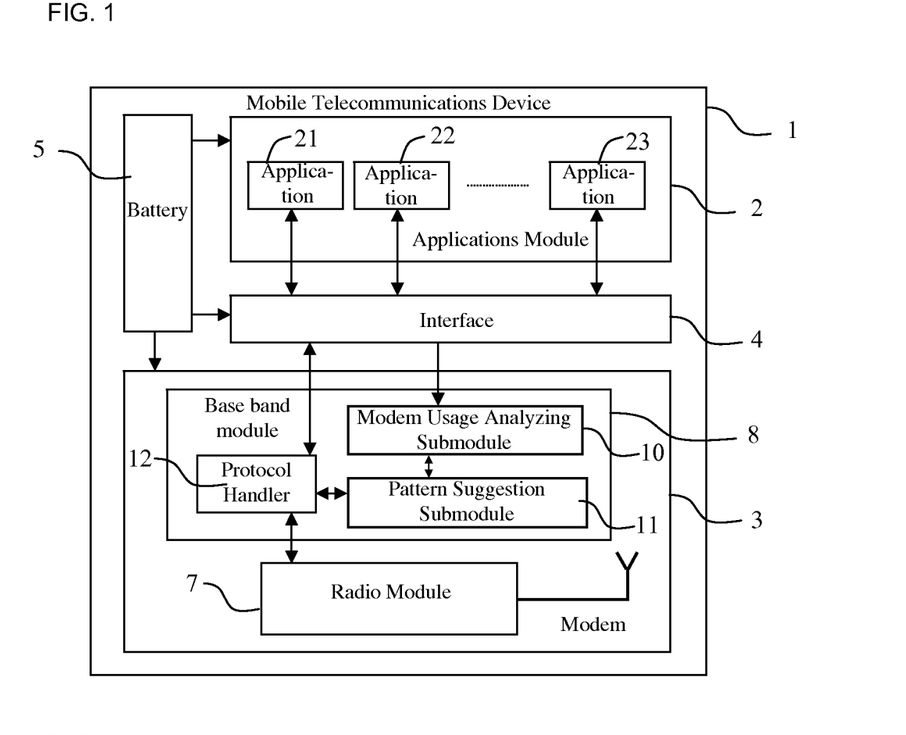
FIG. 1 schematically shows a mobile telecommunication device according to an embodiment of the invention.

FIG. 1 schematically shows a mobile telecommunication device 1 according to an embodiment of the invention. The mobile telecommunication device 1 comprises an application module 2 configured to execute one or more applications 21, 22, 23. The device 1 also comprises a modem 3 and an interface 4. Furthermore the mobile telecommunication device 1 comprises a battery 5 arranged to supply energy to the application module 2, the interface 4 and the modem 3.

The modem 3 comprises a radio module 7 (also referred to as radio block) configured to communicate radio signals to and from a remote network node. The modem 3 also comprises a base band module 8 (also referred to as base band block) configured to communicate data to and from the radio module 7. The base band module 8 is configured to code and decode the data received from the radio module 7 using a communication protocol, such as WCDMA. The base band module 8 comprises a modem usage analysing submodule 10, a pattern suggestion submodule 11 and a protocol handler 12. The application module 2 may be a processor running an operating system e.g. Android, Windows or IOS and one or more software applications. The software applications may comprise all sorts of applications normally running on a mobile telephone. Examples of applications are: a voice communication application, a software game, an Internet application, etcetera.

The modem usage analysing submodule 10 is configured to receive modem requests from the applications 21, 22, 23 and to analyze all modem requests. Typically the analysing submodule 10 repeatedly analyses the modem requests received during a predefined time period. Typical time periods for each repeated analyse period could last longer than 100 ms and are less than 100 s.

The pattern suggestion submodule 11 is configured to receive aggregated modem request information from the modem usage analyzing submodule 10 and to select a reception and transmission (DRX/DTX) pattern out of a set of possible patterns depending on the properties of the modem request information, as transmitted from the modem usage analysing submodule 10. The properties could include information on the repetition frequency of the requests, the variation in data load, and information on the burstyness for each data request. The information could be separate for uplink and downlink directions respectively.

The pattern suggestion submodule 11 is analysing the above mentioned properties of the modem request information in order to select a suitable DRX/DTX pattern. One example of how such selection process could be implemented will be illustrated with reference to FIG. 7. The protocol handler 12, also referred to as Radio Resource Control (RRC) protocol handler 12, is configured to create a signal incorporating one or more parameters that define the selected DRX/DTX pattern, to a network node (not shown in FIG. 1) using e.g. a 3GPP protocol.

When one of the applications 21, 22, 23 needs access to services provided by the modem 3, it needs to ask the modem 3 for connectivity. This is done via the interface 4. In other embodiments, the interface can be absent. But in order to make the application module (e.g. running android, IOS or any other standard operating system) independent of the modem functionalities, it is preferred to use an application-to-modem interface. This interface makes the application side more generic.

As mentioned above, the total required modem usage summary is sent to the pattern suggestion submodule 11. This submodule is configured to propose a suitable DRX/DTX pattern based on the total modem usage information provided by the analysing submodule 10. When the DRX/

DTX pattern suggestion submodule 11 has found a proposed pattern, it sends this information to the RRC protocol handler 12 which then, using the 3GPP protocol, will transfer this proposal to the network node.

Figure 2:
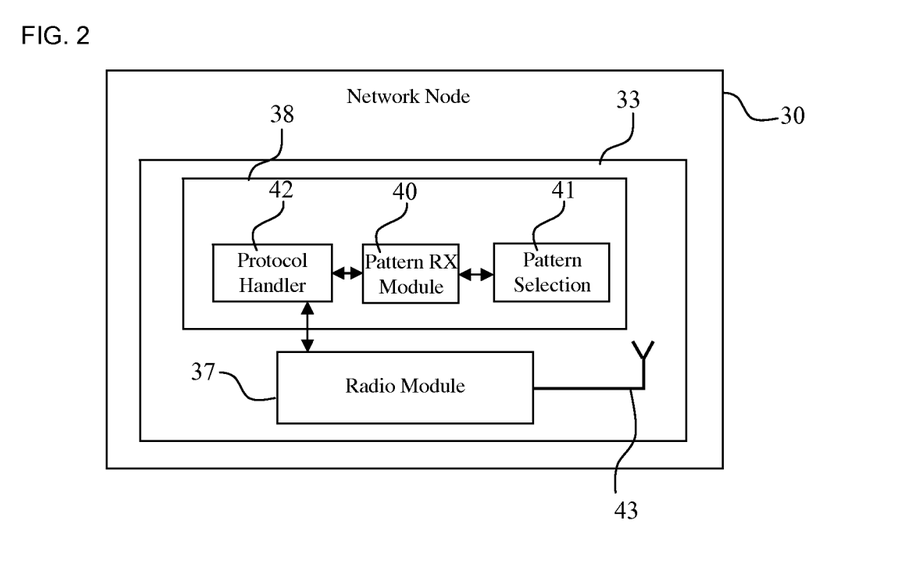
FIG. 2 schematically shows an embodiment of a network node of mobile telecommunication network.

FIG. 2 schematically shows an embodiment of a network node 30 of mobile telecommunication network. Only the components which relate to the embodiments of the invention are shown. The network node 30 may be a base station, called NodeB in WCDMA and eNodeB in LTE. The network node 30 comprises a modem 33. The modem 33 comprises a radio module 37 configured to communicate radio signals to and from a mobile telecommunication device, such as the telecommunication device 1 shown in FIG. 1. The modem 33 also comprises a base band module 38 configured to communicate data to and from the radio module 37. The base band module 38 is configured to code and decode the data received from the radio module 37 using a communication protocol, such as WCDMA. The base band module 38 comprises a suggested pattern receiving module 40, a pattern selection module 41 and a protocol handler 42. The radio module 37 comprises one or more antennas 43 physically receiving and transmitting signals. The radio module 37 is configured to transform the radio signals to/from digital data. The modem baseband module 38 is configured to process the digital data and to create protocol signals according to the 3GPP standard.

The protocol handler 42 receives the RCC signalling from the mobile communication device 1, and transfers the information to the so-called 'suggested pattern receiving' module 40. Module 40 is a receiving submodule configured to receive and/or process the DRX/DTX pattern suggested by one or more mobile telecommunication devices. In an embodiment, the suggested pattern receiving module 40 communicates the received proposal (i.e. suggestion) to the DRX/DTX pattern selecting module 41. In an embodiment, the suggested pattern receiving module 40 is configured to combine all requests into a summarized information regarding the DRX/DTX pattern requests from all active devices and to send that information to the selection module 41.

In an embodiment, a list of possible patterns is stored and/or managed by the DRX/DTX pattern selecting module 41. This information can as one example be predefined DRX/DTX patterns approved by the operator that is responsible for the services provided by the network, and or recommended by the network vendor implementing the network nodes. If the suggested pattern can be found in the list, the DRX/DTX pattern selecting module 41 may decide to use that pattern in a communication session with the mobile communication device 1 depending on one or more network requirement criteria. One of such criteria may be that the combined usage of all patterns for all active terminals, considering the terminal suggested DRX/DTX patterns, is suitable for the network in a capacity utilization and traffic scheduling flexibility perspective. If the suggested pattern does not fulfil such criteria, the DRX/DTX pattern selecting module 41 will decide to use another pattern most appropriate for the upcoming session(s). It should be noted that modules 40 and 41 can be one module, depending on the implementation. Other configurations are possible, both software and/or hardware configurations. This also applies for the other modules shown in FIGS. 1 and 2. The utilization of DRX and DTX is controlled by the network node 30, and the control signalling is done by high layer radio resource control (RRC) signalling. The RRC signalling block 12 and 42 handle the communication of the RRC signals between the telecommunication device 1 and the network node 30.

According to an embodiment, the radio resource control signalling includes a functionality not only for the base station to define and distribute the selected DRX/DTX usage pattern to the mobile telecommunication device 1 according to existing RRC signalling functionality in WCDMA and LTE, but also for the mobile telecommunication device 1 to regularly send proposed DRX/DTX usage pattern, based on the existing transmission and reception needs from the ongoing applications 21, 22, 23 within the mobile telecommunication device 1. The mobile telecommunication device 1 is configured to signal a recommended, for the mobile telecommunication device 1 most suitable, DRX/DTX pattern and to include this into the specification of the so-called RRC connection establishment.

Figure 3:
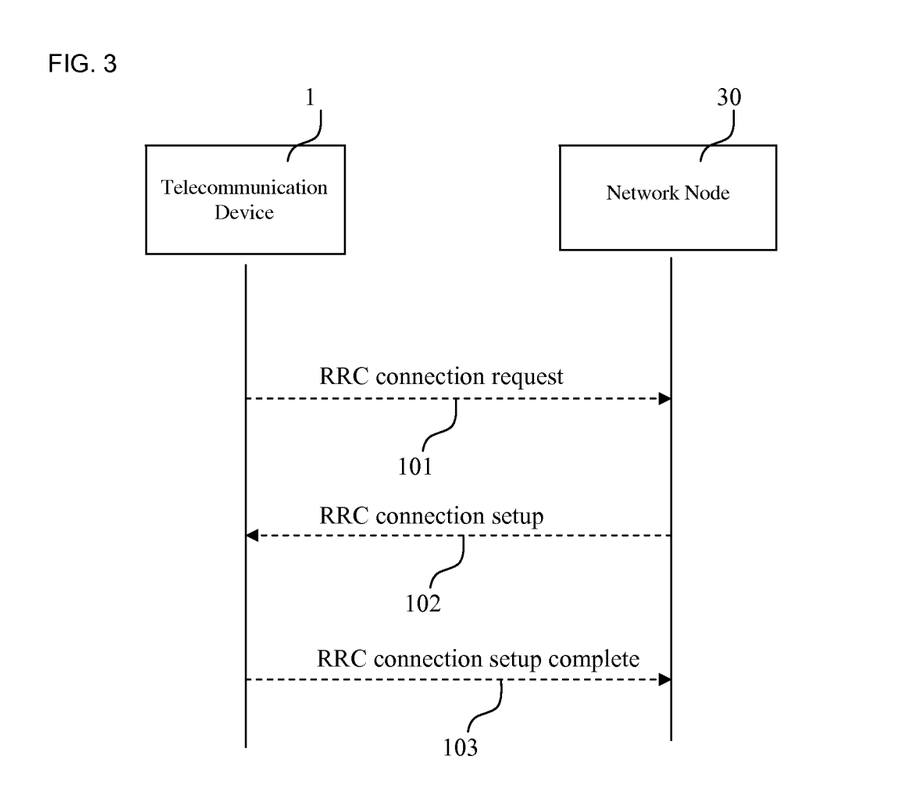
FIG. 3 shows a communication chart indicating a RRC connection establishment between the mobile communication device and the network node according to an embodiment.

FIG. 3 shows a communication chart indicating a RRC connection establishment between the mobile telecommunication device 1 and the network node 30 according to an embodiment. The RRC connection establishment is terminal initiated (i.e. initiated by the device 1) and due modification of 3GPP standard includes a suggested DRX/DTX pattern, see a RRC connection request indicated by arrow 101. The network node 30 will then select a DRX/DTX pattern taking into account the pattern suggested by the mobile telecommunication device 1. In the response from the network node 30, being part of the RRC connection establishment, the network node 30 will signal the selected DRX/DTX pattern in a RRC connection setup message, see arrow 102. Next, the device 1 will send a RRC connection complete message t the network node 30, see arrow 103.

The RRC signalling for WCDMA is specified in 25.331, and the DRX/DTX parameters are described in section 10.3.6, called DTX-DRX information. The specific DRX/DTX parameters signalled to control DRX/DTX functionalities for LTE are described in the MAC main configuration in section 6.3.2 of 36.331.

Figure 4:
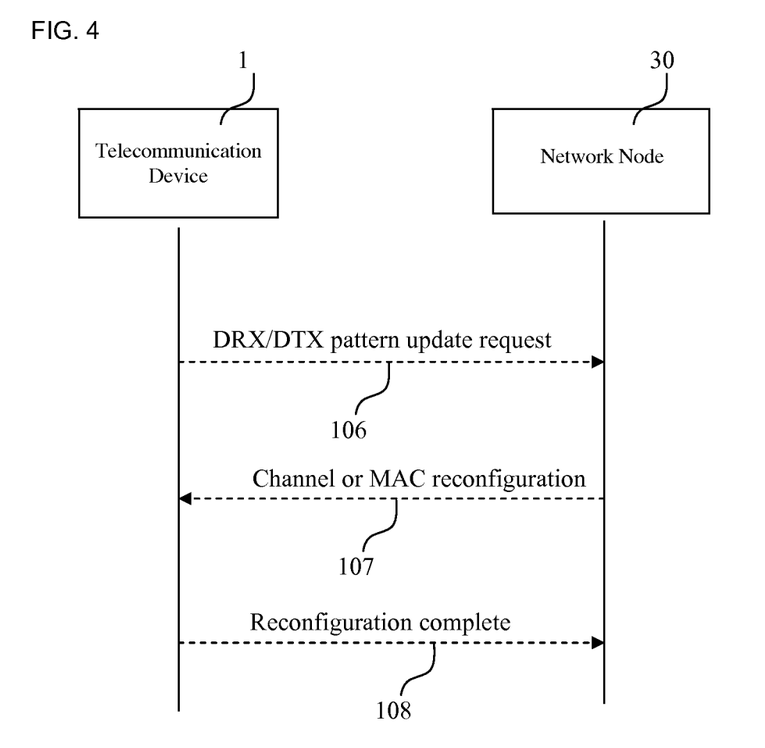
FIG. 4 shows a communication chart indicating a RRC connection establishment between the mobile communication device and the network node according to a further embodiment.

FIG. 4 shows a communication chart indicating a RRC connection establishment between the mobile telecommunication device 1 and the network node 30 according to a further embodiment. In this embodiment the RRC signalling includes a possibility for the telecommunication device 1 to update its recommended DRX/DTX pattern during a session.

When the mobile telecommunication device 1, due to e.g. a change of the applications running in the mobile telecommunication device 1 has benefit of updating the signalling of a recommended DRX/DTX pattern, it will send an update of the proposed DRX/DTX pattern, via a newly defined RRC signal into the 3GPP specification, see arrow 106. The network node 30 may or may not respond to such update by making a reconfiguration of the DRX/DTX pattern, see arrow 107. This can for example be done via existing protocols for physical channel reconfigurations in WCDMA or MAC main reconfiguration in LTE. The mobile telecommunication device 1 will then respond with a reconfiguration complete message, see arrow 108.

Figure 5:
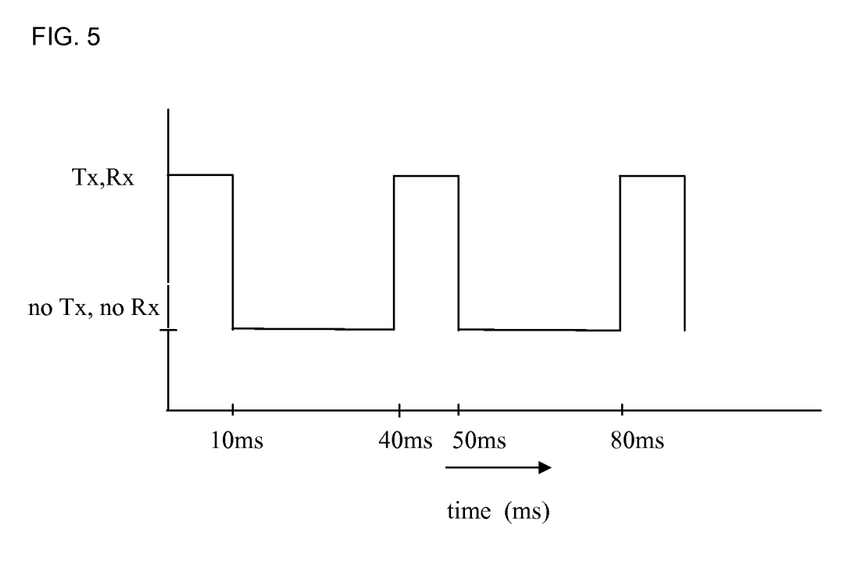
FIG. 5 shows an example of a state diagram of the DRX/DTX activity of the radio module.

The telecommunication device 1 will suggest to the network node 30 the 'most suitable' DRX/DTX pattern. Selecting a suitable DRX/DTX pattern may be based on the type of modem usage that the modem 3 requests. For example in case of a voice call, where an application is using a voice encoder/decoder, the encoder/decoder sends/receives a voice frame with a well known pattern. The voice frame used by the voice encoder/decoder may for example include data for 20 ms of the voice call every 20 ms. In that case a suitable set of DRX/DTX parameters would be to ensure that the modem is sending and receiving data during a short active period reoccurring every 20 ms or every 40 ms if concatenating two voice frames, etcetera. If, in a case of concatenating two frames, and if the modem transmission data rate is high enough to transfer the two frames over the modem communication link in less time than 40 ms, assuming that the transfer time of two frames is 10 ms, the modem could potentially switch off it's "radio block" during the remaining 30 ms, until two new voice frames are received from the voice encoder/decoder. Hence for such a voice call a period of 40 ms between each new modem activity is a 'most suitable' value to minimize modem utilization in, while maintaining relatively low transmission latency. Such an example is shown in the state diagram illustrated in FIG. 5. FIG. 5 shows an example of a state diagram of the state of the radio module 7, wherein during every period of 40 ms, the modem is off during 30 ms, so as to minimize the modem power consumption.

If however the telecommunication device 1 at a certain point in time starts using an online-game that is requesting every 10 ms, via the modem access interface 4, modem access for updating game data, the most suitable DRX/DTX parameters will be different. The above mentioned 40 ms activity periodicity would mean that many of the requested game updates would need to wait and therefore be delayed, until modem is allowed to activate it's radio module 7. A suitable DRX/DTX pattern would rather be that modem is allowed to transmit data every 10 ms.

Preferably the most suitable DRX/DTX parameters are those which allow the modem 3 to inactivate the radio module 7 as long periods as possible in order to save battery current, still of course requiring that the mobile telecommunication device 1 and the network node 30 are not losing their connection. So it should be clear that a balance must be found between saving battery power by inactivating the power consuming radio module 7 as much as is allowed by the DRX/DTX parameters, and still maintaining a DRX/DTX parameter settings that enables the device 1 and the network node 30 to transfer required control signals required to keep the connection synchronized.

In present DRX/DTX pattern descriptions, as described in the specification 25.331 for WCDMA and 36.331 for LTE, there are several parameters used to define a certain DRX/DTX pattern. One of the parameters is called "inactivityThreshUeDrxCycle". This parameter defines how long time after each active Rx cycle the modem is forced to be switch on in order to be ready in case the application will require additional data to be transferred. Having a long value for "inactivityThreshUeDrxCycle" can be good in case the application sends data in bursts, meaning that when one packet arrives, there is a high likelihood for more packets to come very soon. So then the modem 3 shall not be allowed to inactivate the radio module 7 for a certain period so that it is ready for the next packet. If the network node 30 selects to send a high value on the parameter "inactivityThreshUeDrxCycle", e.g. 40-60 ms, it will mean that this is not at all tailor made for voice calls, since for voice calls it is known that no additional voice frames will come immediately after one. They always come with a known time interval in between, e.g. 20 ms or 40 ms (as described above).

Hence, if a network as general (non tailor made setting) use e.g. 40 ms for this parameter, a terminal will never be able to inactivate the receiver in the radio module 7 for a voice call. The receiver consumes at least 40 mA when switched on.

By implementing the invention, a tailor made pattern selection for different terminal services such as voice service is possible. An example would be for the mobile telecommunication device 1 to suggest a DRX/DTX pattern where the parameter "inactivityThreshUeDrxCycle" is set to 0, allowing the mobile telecommunication device 1 to immediately switch off receiver part of the radio module 7 after each voice frame. This could provide a Rx duty cycle of 25% instead of 100%. Hence, only on the receiver side of the radio module 7 already typically 30 mA can be saved during a voice call. A possible suitable pattern for such a case is illustrated in the state diagram shown in FIG. 6. If it is further assumed that the transmission side of the radio module can be switched off during the same time as the receiver side is switched off, (i.e. allowing the transmitter to switch off after each voice frame has been transmitted), by setting transmission periods to every 40 ms, a DRX/DTX pattern can be suggested by the device 1, as shown in FIG. 5, which will reduce the total RF duty cycle from 100% to 25%, potentially giving savings in the order of 75-100 mA during a voice call.

Figure 6:
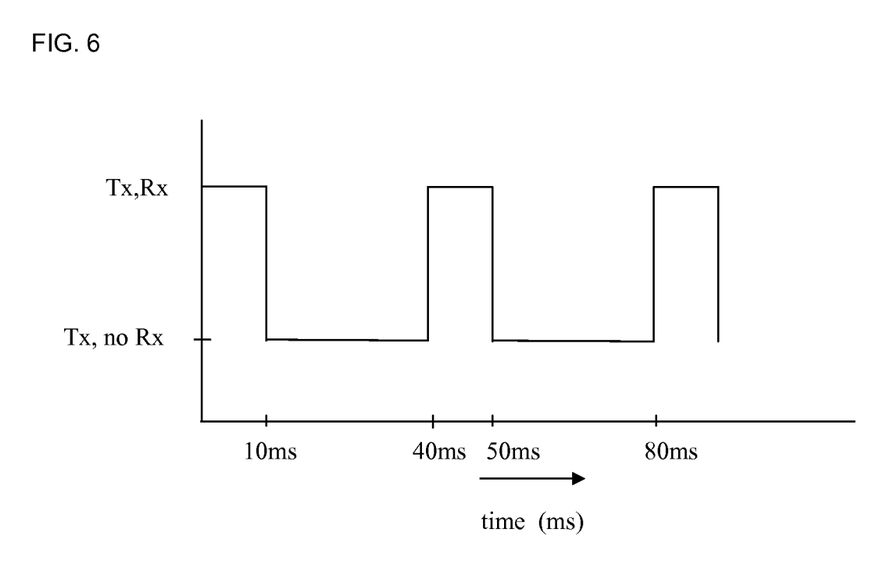
FIG. 6 shows another example of a state diagram of the DRX/DTX activity of the radio module.

The above mentioned example of FIGS. 5 and 6 is one illustration of how this invention could improve the utilization of DRX/DTX. The properties of a tailor made pattern will depend on the services currently running in the mobile telecommunication device 1 requesting modem access, and one can also consider other examples of services and their tailor made pattern. One example is a gaming service, mentioned above to typically request regular network access with relatively short periods in between. In case of a service request pattern of 10 ms, a tailor made DRX/DTX pattern could ask for 10 ms between active periods, and in order to switch off the radio block 7 as soon as possible, the suggested value for the inactivity threshold parameter "inactivityThreshUeDrxCycle" would be 0 ms.

Figure 7:
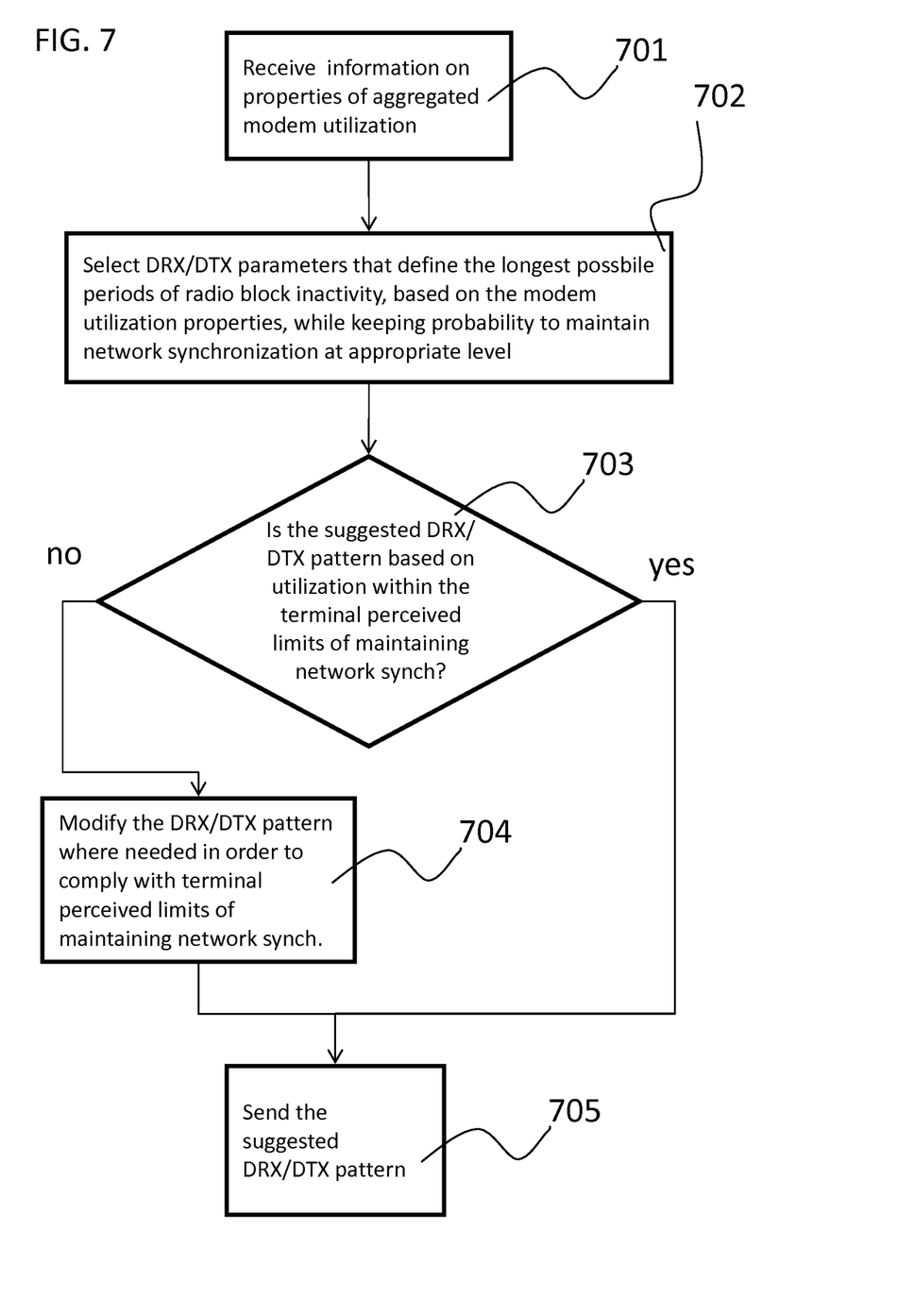
FIG. 7 is a flow chart of an example of a selection process implemented in a network node according to an embodiment.

FIG. 7 shows a flow chart describing an example of a selection process executed by the pattern suggestion submodule 11 according to an embodiment. The pattern suggestion submodule 11 receives, in a first step 701, information on properties of aggregated modem utilization. Then, in a step 702, it selects a certain DRX/DTX pattern that, based on the received modem request information, will provide the longest periods of inactivity for the radio module. The pattern suggestion submodule also needs to consider the current properties of the radio communication environment. Within the selection of suitable pattern the submodule in step 702 also will analyze this and take into account e.g. minimum duty cycle for the radio receiver in order to maintain synchronization with base station. In step 703 the output results from 702 are analyzed. If the selected DRX/DTX pattern from step 702, based on utilization, is not within the terminal perceived limits of maintaining network synchronisation, a next step 704 follows in which the selected DRX/DTX pattern is adjusted in order to ensure the terminal radio module with the adjusted DRX/DTX pattern would be switched on frequently enough to receive needed control signal information from the network. Hence this step could potentially adjust the DRX/DTX pattern found in the step 702, to result in a bit higher radio module utilization. In a next step 705, the suggested DRX/DTX pattern is sent to the network node. In an embodiment, the pattern suggestion submodule 11 is configured to include a hysteresis in terms of a timer preventing the submodule 11 to forward new suggested DRX/DTX patterns until the timer is expired. In another embodiment the pattern suggestion module is only forwarding the new suggested DRX/DTX pattern when more than one parameter in the pattern has changed. Both of these two embodiments include a restriction to possible new pattern signalling so as to minimize the signalling overhead. Since each transferred control information, i.e. any suggestion of a new DRX/DTX pattern, will cause additional overhead in the communication system, it is preferred that the terminal 1 only suggests a new DRX/DTX pattern if a significant modem power consumption saving will occur, in comparison to a previously suggested pattern. It is also conceivable that a general limitation on the number of suggested patterns for a certain period of time is used.

Although the invention has been shown and described with respect to certain preferred embodiments, it is obvious that equivalents and modifications will occur to others skilled in the art upon the reading and understanding of the specification. For example, instead of using the 3GPP protocol, any other type of wireless communication protocol could be used that is able to adopt a scheme for DRX/DTX. The present invention includes all such equivalents and modifications, and is limited only by the scope of the following claims.

The invention claimed is:

1. A mobile telecommunication device comprising:
   an application module configured to execute one or more applications;
   a radio module configured to communicate radio signals to and from a remote network node,
   a base band module configured to communicate data between said application module and said radio module, and to code and decode said data using a communication protocol, wherein said base band module comprises:
      a modem usage analysing submodule configured to receive modem requests from said one or more applications, and to analyze all modem requests received during a predefined time period to generate aggregated application modem request information;
      a pattern suggestion submodule configured to receive the aggregated application modem request information from said modem usage analyzing submodule, and to select a discontinuous reception (DRX) pattern and select a discontinuous transmission (DTX) pattern using said aggregated application modem request information, and
      a Radio Resource Control protocol handler configured to send one or more parameters defining said selected DRX pattern and DTX pattern to said network node as proposed DRX and DTX patterns to support current communications activity of the one or more applications and conserve battery resources of the mobile telecommunication device.

2. Mobile telecommunication device according to claim 1, wherein said device is configured to:
   receive a control signal from said network node, said control signal identifying a further DRX pattern and DTX pattern to be used for a current communication session, and
   switch on and off the radio module during said session according to said further DRX pattern and DTX pattern.

3. Mobile telecommunication device according to claim 2, wherein said pattern suggestion submodule is configured to select said DRX pattern and DTX pattern out of a set of possible patterns stored on the mobile telecommunication device.

4. Mobile telecommunication device according to claim 1, wherein said pattern suggestion submodule is configured to select said DRX pattern and DTX pattern out of a set of possible patterns stored on the mobile telecommunication device.

5. A telecommunication system, comprising:
   a Network node for a telecommunication network, said network node comprising:
      a radio module configured to communicate radio signals to and from a mobile telecommunication device;
      a base band module configured to communicate data to and from said radio module, and to code and decode said data using a communication protocol, wherein said base band module comprises:
         a proposed pattern receiving submodule configured to receive, from the mobile telecommunications device, one or more parameters defining a proposed discontinuous reception (DRX) pattern and a proposed discontinuous transmission (DTX) pattern to support current communications activity of applications executed by the mobile telecommunication device;
         a pattern selecting submodule configured to select a DRX pattern and a DTX pattern, wherein if one or more network criteria are met, said proposed DRX pattern and DTX pattern are the selected DRX pattern and DTX pattern;
      a Radio Resource Control protocol handler configured to receive and send one or more parameters defining said selected DRX pattern and DTX pattern to said mobile telecommunication device; and
   a mobile telecommunication device communicatively couplable to the network node for providing and receiving DRX and DTX patterns, the mobile telecommunication device comprising:
      an application module configured to execute one or more applications;
      a radio module configured to communicate radio signals to and from a remote network node,
      a base band module configured to communicate data between said application module and said radio module, and to code and decode said data using a communication protocol, wherein said base band module comprises:
         a modem usage analysing submodule configured to receive modem requests from said one or more applications, and to analyze all modem requests received during a predefined time period to generate aggregated application modem request information;
         a pattern suggestion submodule configured to receive the aggregated application modem request information from said modem usage analyzing submodule, and to select a discontinuous reception (DRX) pattern and select a discontinuous transmission (DTX) pattern using said aggregated application modem request information, and
         a Radio Resource Control protocol handler configured to send one or more parameters defining said selected DRX pattern and DTX pattern to said network node as proposed DRX and DTX patterns to support current communications activity of the one or more applications and conserve battery resources of the mobile telecommunication device.

6. Network node according to claim 5, wherein said one or more criteria comprise at least one or more of the following:
   a level of interference in the network receiver is below an acceptable level;
   a risk to lose the connection between said mobile telecommunication device and the network node is below an acceptable risk level.

7. A method of executing communications in a mobile telecommunication device, the method comprising:

setting up a communication with a remote network node via a modem;

executing one or more applications, wherein said applications request access to said modem;

analyzing the modem requests during a predefined time period to generate aggregated application modem request information;

selecting a discontinuous reception (DRX) pattern and selecting a discontinuous transmission (DTX) pattern using said aggregated application modem request information;

sending one or more parameters defining said selected DRX pattern and DTX pattern to said network node as proposed DRX and DTX patterns to support current communications activity of the one or more applications and conserve battery resources of the mobile telecommunication device.

8. The method of claim 7, further, comprising:

receiving a radio resource control (RRC) connection request from said mobile telecommunication device, said RRC connection request comprising one or more parameters defining discontinuous reception (DRX) pattern and discontinuous transmission (DTX) pattern to support current communications activity of the applications executed by the mobile telecommunication device;

selecting a DRX pattern and a DTX pattern, wherein if one or more network criteria are met, said received DRX pattern and DTX pattern are the selected DRX pattern and DTX pattern;

sending an RRC connection setup message to said mobile telecommunication device.

\* \* \* \* \*